July 1, 1930.  G. A. BURNHAM  1,769,051
ELECTRIC SWITCH AND EXPANSIBLE CASING THEREFOR
Filed April 14, 1926

Inventor,
George A. Burnham
by
T. Drummond
Atty

Patented July 1, 1930

1,769,051

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC SWITCH AND EXPANSIBLE CASING THEREFOR

Application filed April 14, 1926. Serial No. 102,072.

This invention relates to heavy duty electric switches and particularly, although not necessarily limited, to that type of switch which is enclosed in a substantially gas tight and pressure-resisting enclosing casing; and has for an object the provision of an expansible and yielding casing construction which is adapted to yield while, preferably, maintaining the casing tight, under the heavy internal pressures resulting from interruption of the switch circuit under abnormal conditions, whereby to absorb energy resulting from such abnormal conditions and reduce the stresses on the various parts of the casing and thereby to enable the switch safely to withstand such pressures which, with the usual casing construction, might disrupt the casing.

A further object of the invention is generally to improve the construction and operation of electric switches.

In accordance with this invention, the casing construction is made with an expansible section connecting the casing cover and the oil receptacle; or the oil receptacle may be, in itself, provided with an expansible construction, as a corrugated wall.

Figures 1, 2:
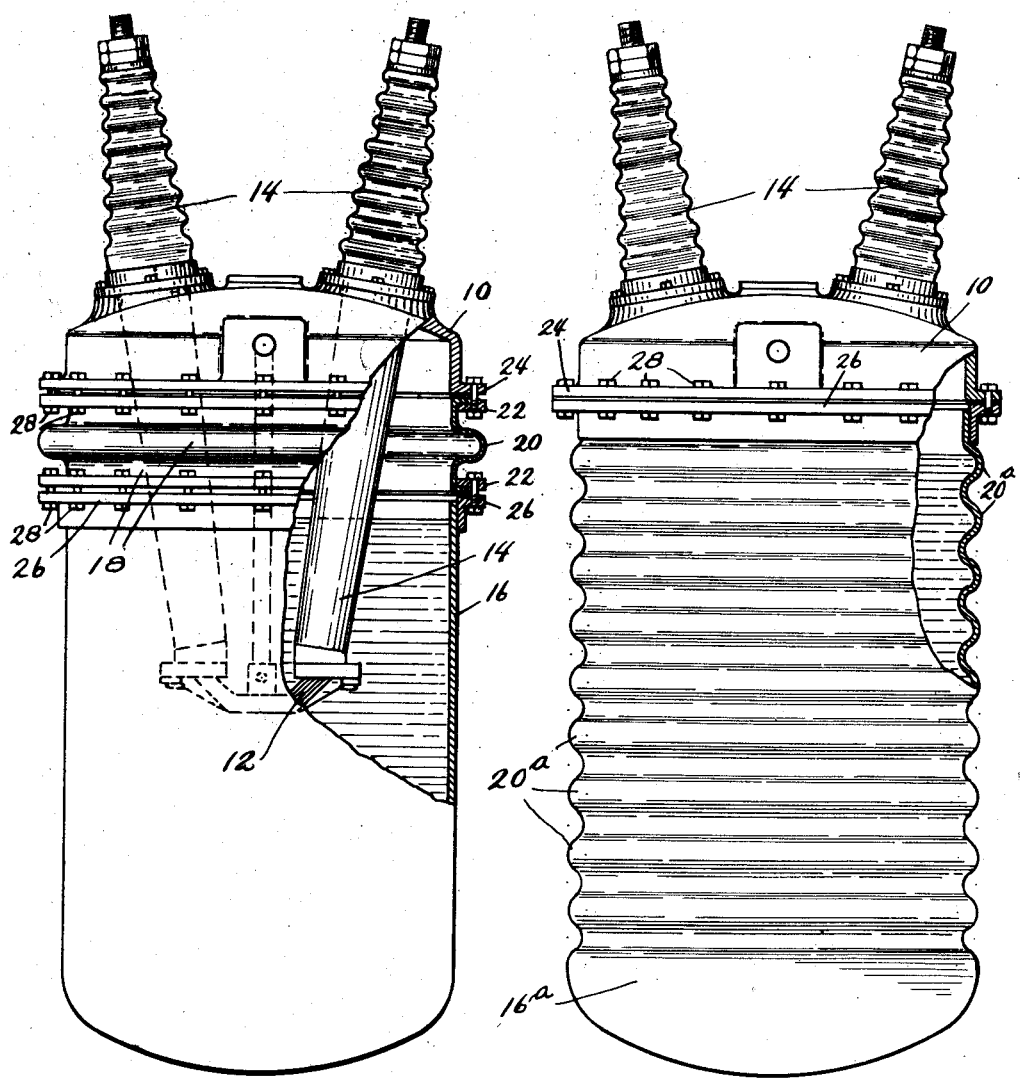
Fig. 1 is a side elevation partly in section of an electric switch embodying the invention.
Fig. 2 is a view similar to Fig. 1 but illustrating a modified form of the invention.

The switch illustrated in Fig. 1 as embodying the invention includes an enclosing casing which comprises the dome shaped cover 10 which forms a supporting frame for the movable and stationary switch members 12 and 14, the oil receptacle 16 which is here shown as cylindrical, and the yielding and expansible section or joint 18 which is interposed between and connects the cover and the oil receptacle.

As here shown, the expansible section is cylindrical in form and is composed of suitably thin and elastic but pressure resistant metal which has relatively reflexed sections providing one or more corrugations 20. Said expansible section is provided with attaching flanges 22 at its upper and lower ends and on opposite sides of said corrugations, and said flanges are attached respectively to a flange 24 of the cover 10 and a flange 26 of the oil receptacle 16 by suitable means as bolts 28. Preferably packing gaskets or other sealing means are provided to seal the joints between the expansible section and the cover and oil receptacle whereby to provide practically gas tight connections thereat.

When the switch is opened under heavy load and a substantial amount of gas is generated from the oil, thereby to build up an abnormal gaseous pressure within the switch, or when pressure otherwise internally acts upon the casing, the expansible section is adapted to yield or expand axially and, to a minor degree, laterally, and absorb some of the energy of circuit interruption and reduce the stresses on the cover and oil receptacle and other parts of the casing while maintaining the casing gas tight, the corrugations 18 being more or less straightened out by the pressure to permit the section to expand. When the pressure within the switch is reduced, the expansible section returns to its normal position by its own inherent resiliency.

With this arrangement, the casing is adapted to yield when subjected to abnormal internal pressures and thereby is enabled successfully to resist higher pressures than would be the case with the usual rigid casing construction.

In the modification illustrated in Fig. 2, practically the entire vertical extent of the side wall of the oil receptacle 16ª is provided with a series of vertically-spaced horizontal corrugations 20ª and the material composing the side wall of the oil receptacle is sufficiently yielding, as is the case of the expansible section 18, to permit the corrugations to be somewhat straightened or stretched when the casing is subjected to abnormal internal pressures although being sufficiently strong to withstand rupture when subject to high pressures, thereby to relieve the stresses incident to such pressures. The corrugations serve also to strengthen the oil receptacle by reason of their formation. The presence of the corrugations, which are exposed to the atmosphere, also serves to cool the oil and the gases in the switch and thus increases both the current carrying and interrupting capacities, in addition to the increase in capacity provided by the expansion of the casing due to the corrugations.

The switch is adapted to be supported in such a manner, not shown, as to permit the casing, or the expansible component thereof, to expand and contract freely.

The term "oil", as herein employed, is generic for any vaporizable arc quenching liquid.

The structure may be otherwise modified without departing from the spirit of the invention.

I claim:

1. An oil immersed electric switch having an enclosing casing provided in part with a separate side wall of elastic material having relatively reflexed cooperating integral sections forming an annular corrugation therein which permits the casing to expand under the influence of an abnormal pressure therein which side wall is attached on opposite sides of said corrugation to cooperating elements of said casing.

2. An oil immersed electric switch having an enclosing casing comprising a cover, an oil receptacle, and a separate expansible section attached to both said cover and oil receptacle and forming in effect a component part of the side wall of said casing.

3. An oil immersed electric switch having an enclosing casing comprising a cover, an oil receptacle and a separate expansible section interposed between said cover and receptacle and having gas tight connections with both and comprising a component part of the side wall of said casing.

4. An oil immersed electric switch having an enclosing casing including a cover, an oil receptacle, and a gas tight expansion joint connecting said cover and oil receptacle.

5. An oil immersed electric switch having an enclosing casing including a cover, an oil receptacle, and a gas tight corrugated expansible section connecting said cover and said receptacle and comprising a component part of the side wall of said casing.

In testimony whereof I have signed my name to this specification.

GEORGE A. BURNHAM.